Dec. 14, 1948.　　　C. E. MILLER ET AL　　　2,456,139
MULTIPLE SPINDLE LATHE

Filed Dec. 19, 1942　　　　　　　　　　　　14 Sheets-Sheet 1

Inventors
Carroll E. Miller
John N. Ingalls
Wright, Brown, Quinby & May
Attys.

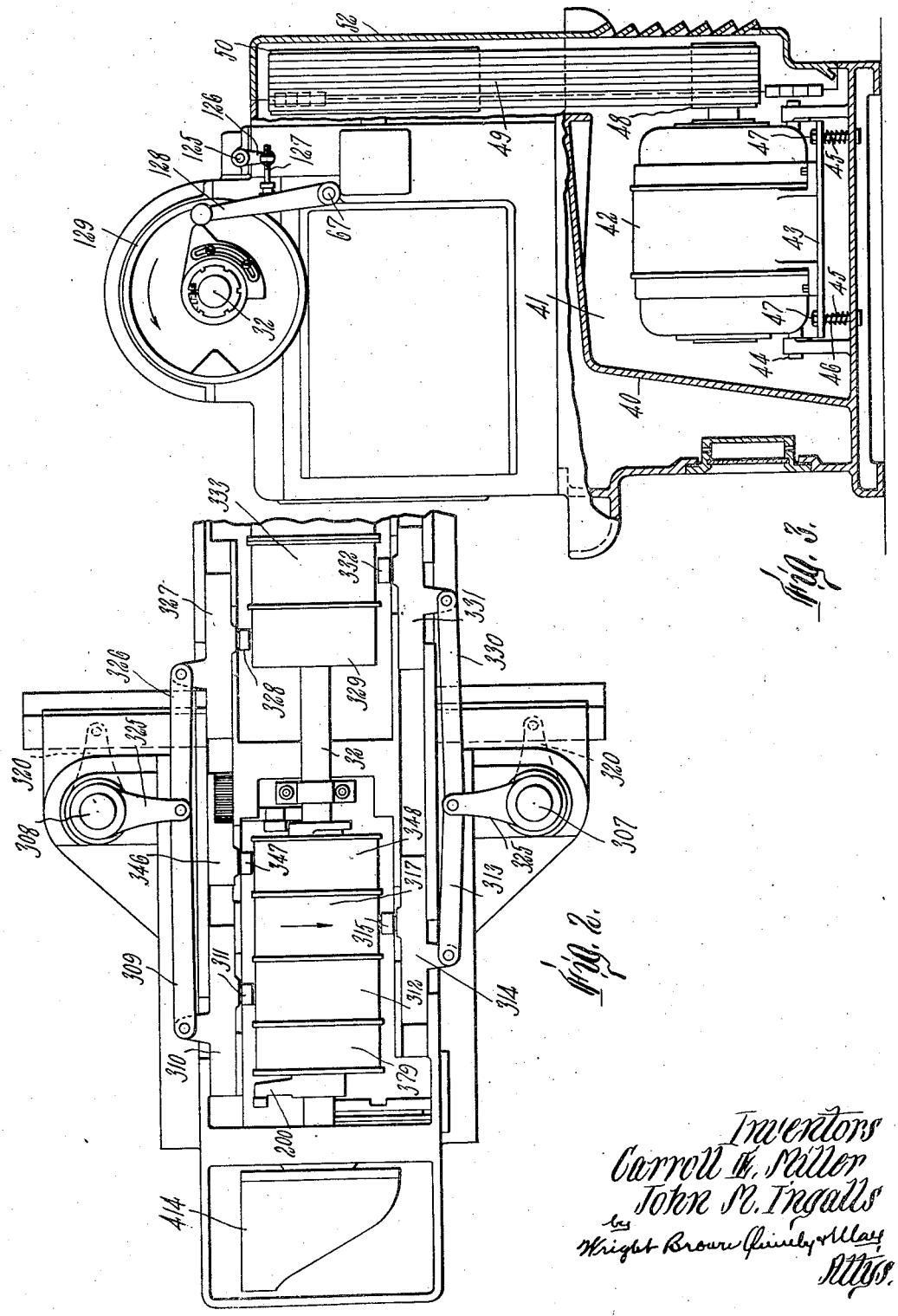

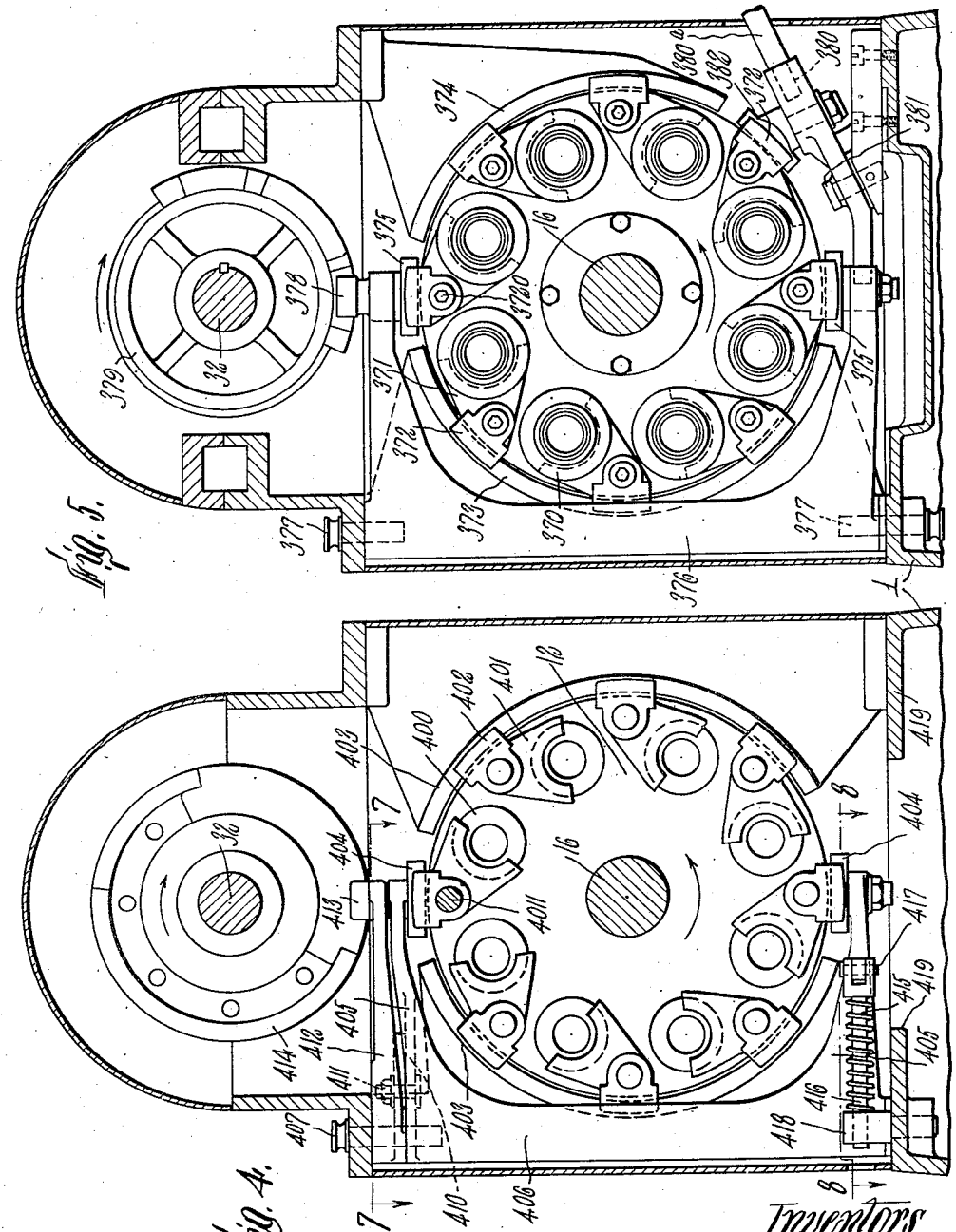

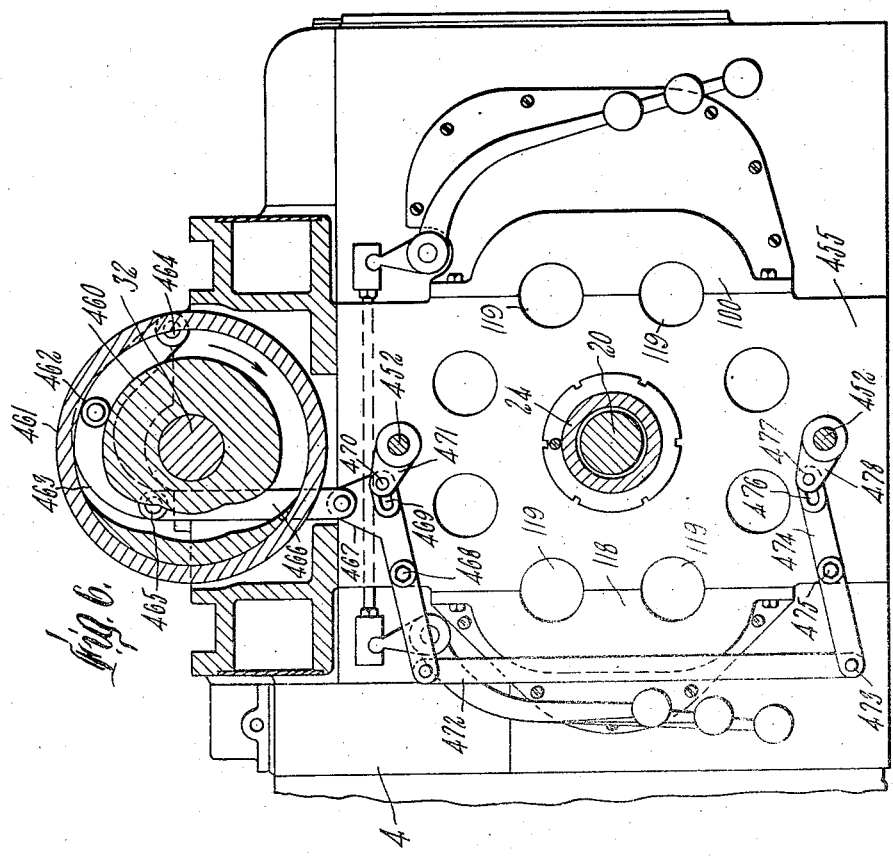

Dec. 14, 1948.  C. E. MILLER ET AL  2,456,139
MULTIPLE SPINDLE LATHE
Filed Dec. 19, 1942  14 Sheets-Sheet 5
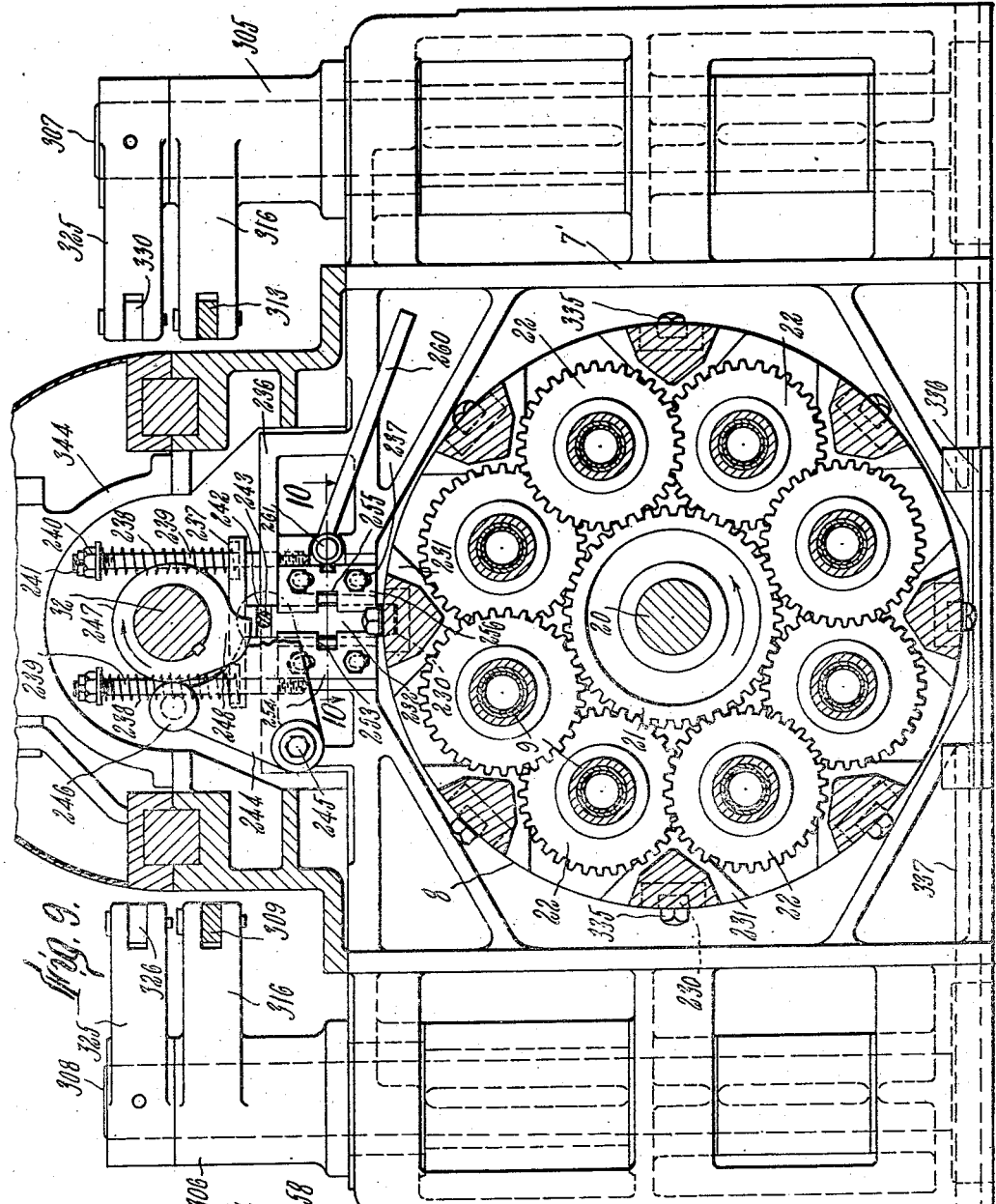
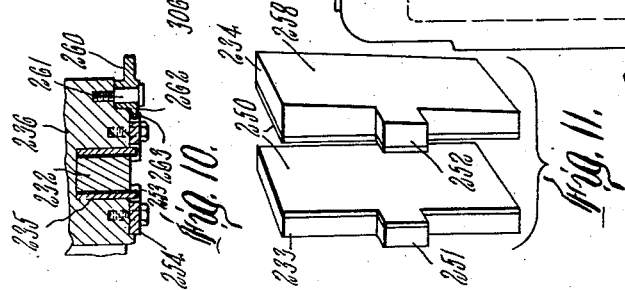
Inventors
Carroll E. Miller
John M. Ingalls
by Wright, Brown, Quinby & May
Attys.

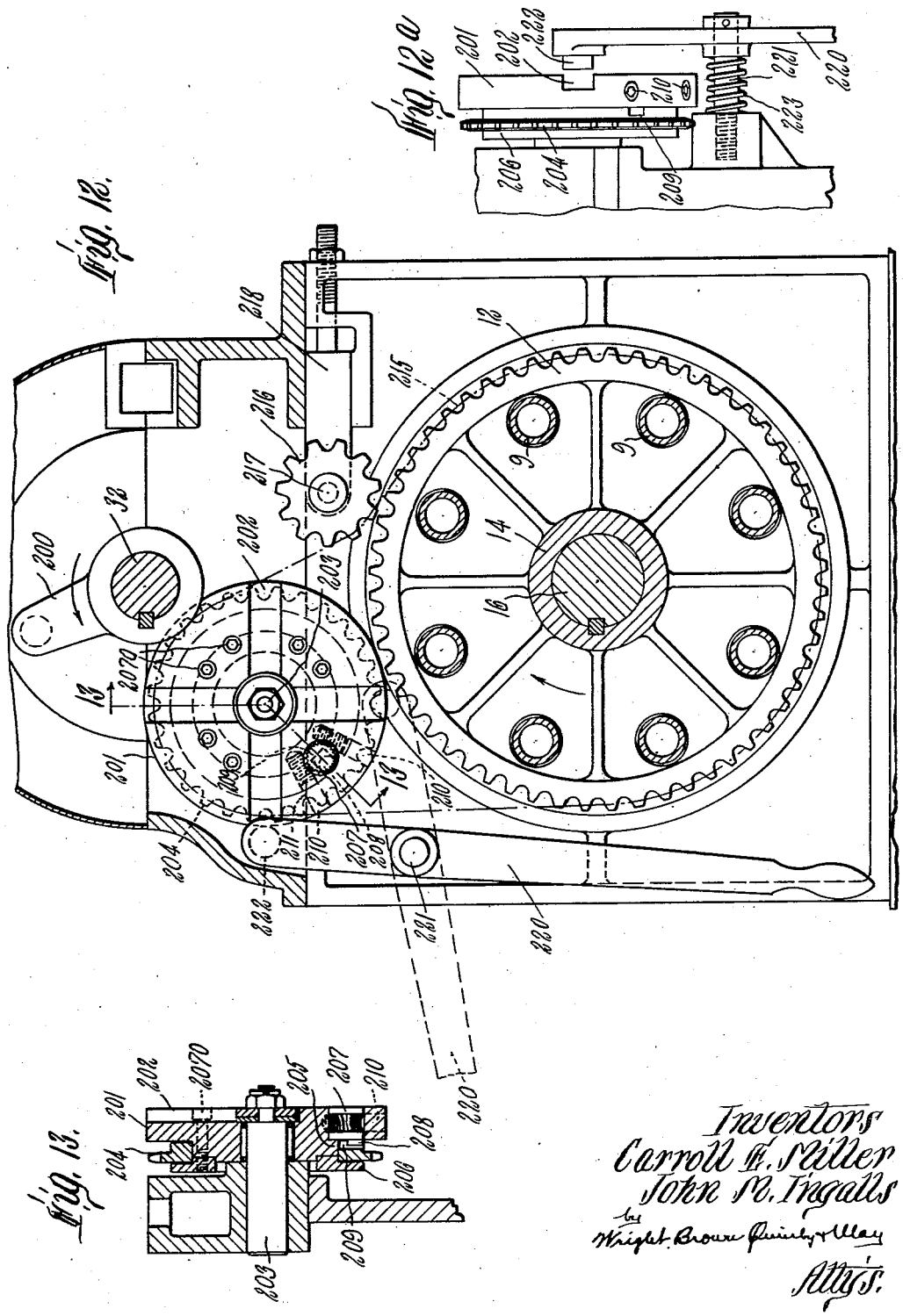

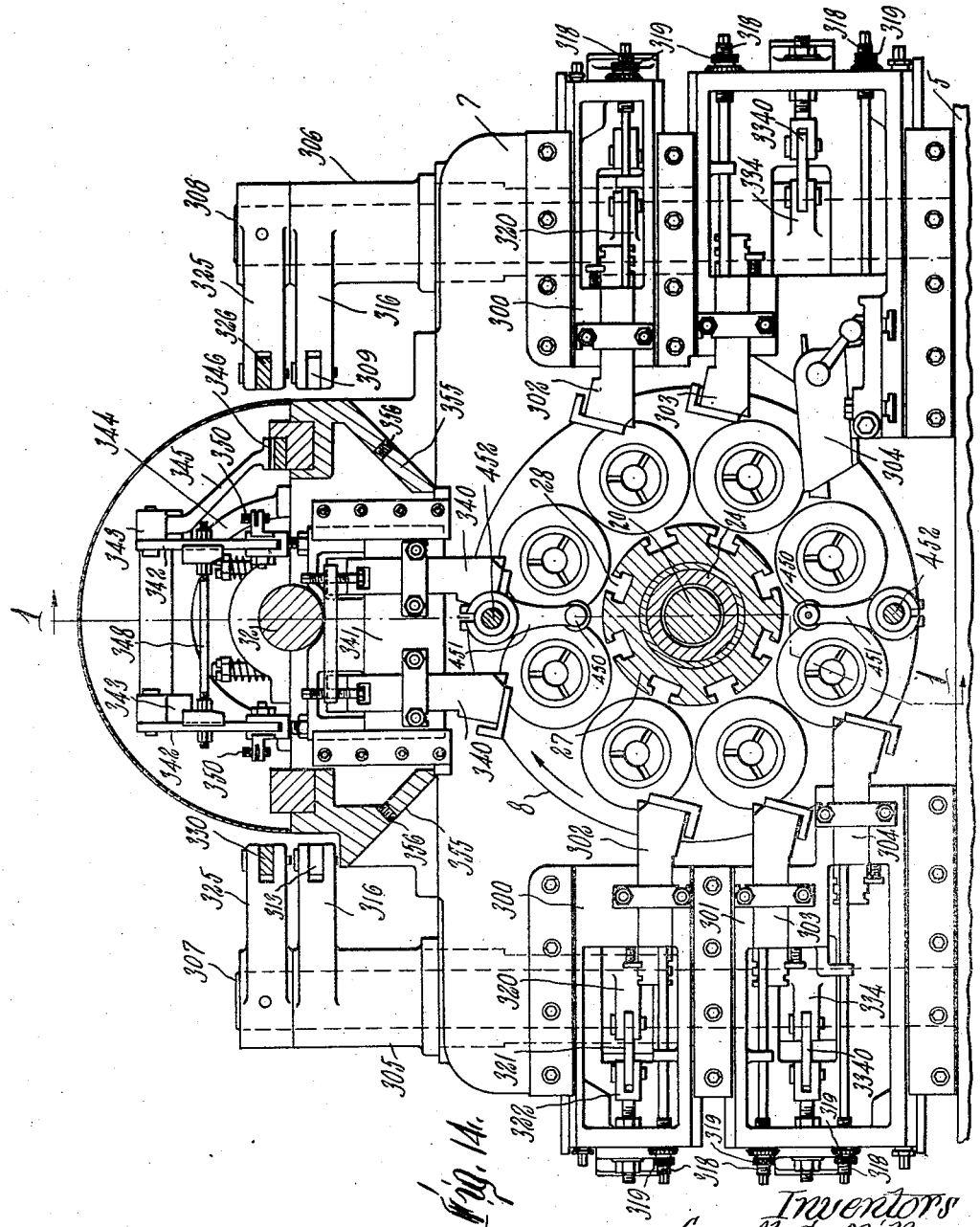

Dec. 14, 1948.　　C. E. MILLER ET AL　　2,456,139
MULTIPLE SPINDLE LATHE

Filed Dec. 19, 1942　　14 Sheets-Sheet 11

Inventors
Carroll E. Miller
John R. Ingalls
by Wright, Brown, Quinby & May
Attys.

Dec. 14, 1948. C. E. MILLER ET AL 2,456,139
MULTIPLE SPINDLE LATHE
Filed Dec. 19, 1942 14 Sheets-Sheet 13

Inventors
Carroll E. Miller
John N. Ingalls
by Wright Brown Quinby May
Attys.

Dec. 14, 1948.  C. E. MILLER ET AL  2,456,139
MULTIPLE SPINDLE LATHE

Filed Dec. 19, 1942  14 Sheets-Sheet 14

Inventors
Carroll E. Miller
John M. Ingalls
by Wright Brown Quinby & May
Attys.

Patented Dec. 14, 1948

2,456,139

UNITED STATES PATENT OFFICE 2,456,139

MULTIPLE SPINDLE LATHE

Carroll E. Miller and John M. Ingalls, Windsor, Vt., assignors to Cone Automatic Machine Company Inc., Windsor, Vt., a corporation of Vermont Application December 19, 1942, Serial No. 469,516

4 Claims. (Cl. 29—37)

This invention relates to multiple spindle lathes and has for an object the improving of such machines in several important respects.

One object is to increase the flexibility of the machine whereby it can be adapted to a larger variety and complexity of operations.

A further object is to make possible the use of more tools during the cycle of operations and to increase the number of tooling stations for the same number of spindles.

A further object is to make the machine more compact while at the same time increasing the accessibility and visibility of various parts.

Still another object is to improve the indexing and locking mechanism for the spindle supporting drum or turret.

A further object is to provide for more flexible control of the machine in setting up for any particular work.

Further objects and advantages will appear from a description of an embodiment of the invention shown in the accompanying drawings in which Figure 1 is a longitudinal sectional view through the machine on line 1—1 of Figure 14.

Figure 2 is a fragmentary top plan view of the left hand portion of the machine.

Figure 3 is a right hand end elevation of the machine with parts broken away and in section.

Figures 4, 5 and 6 are detail sectional views on the correspondingly numbered section lines of Figure 1.

Figures 7 and 8 are detail sectional views on lines 7—7 and 8—8, respectively, of Figure 4.

Figure 1:
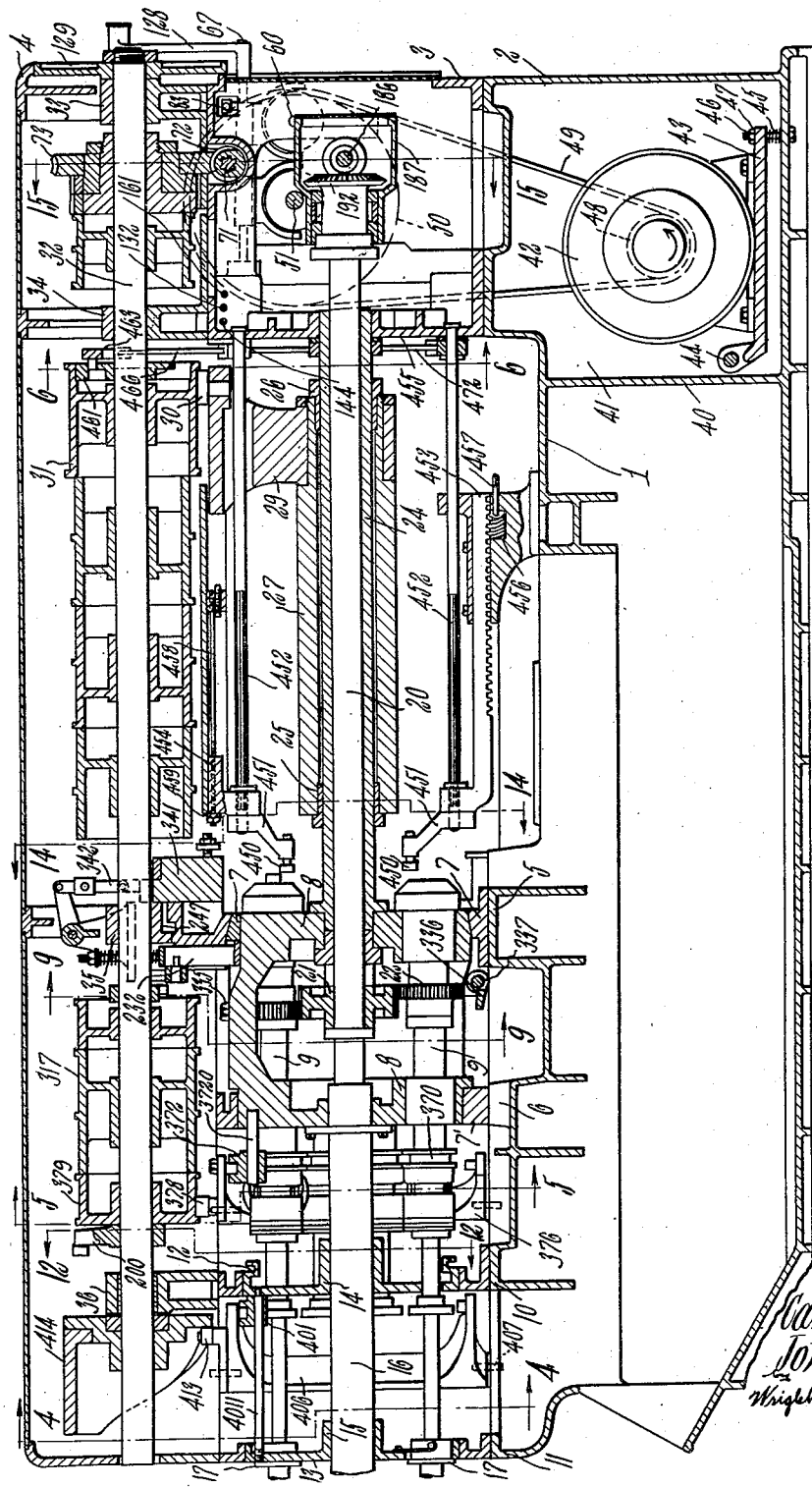

Figure 9 is a detail sectional view on line 9—9 of Figure 1.

Figure 10 is a detail sectional view on line 10—10 of Figure 9.

Figure 11 is a perspective view of portions of the turret locking mechanism.

Figure 12 is a detail sectional view on line 12—12 of Figure 1.

Figure 12a is a fragmentary side elevation showing the hand operated indexing mechanism.

Figure 13 is a detail sectional view on line 13—13 of Figure 12.

Figure 15:
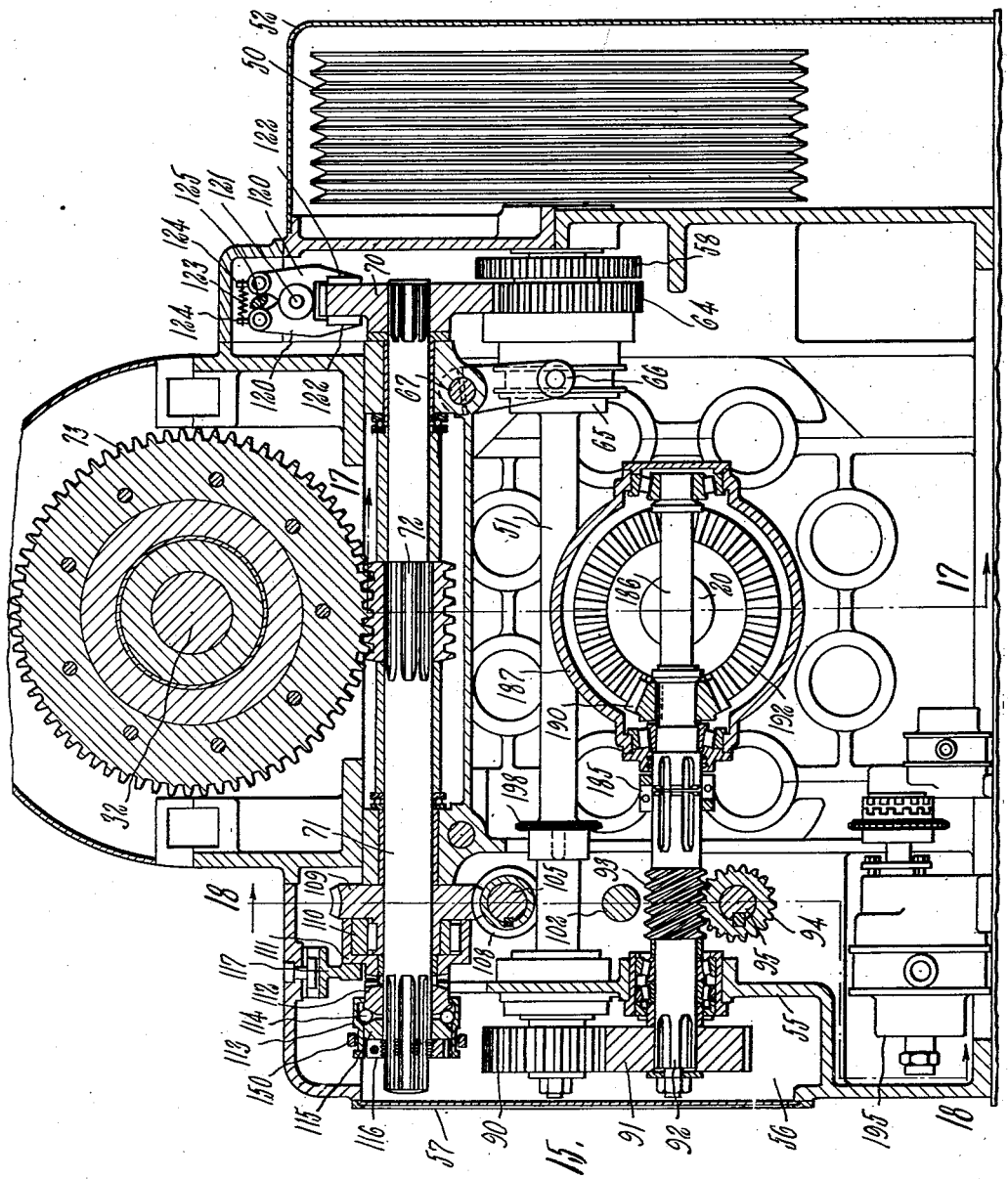

Figures 14 and 15 are detail sectional views on lines 14—14 and 15—15, respectively, of Figure 1.

Figure 16:
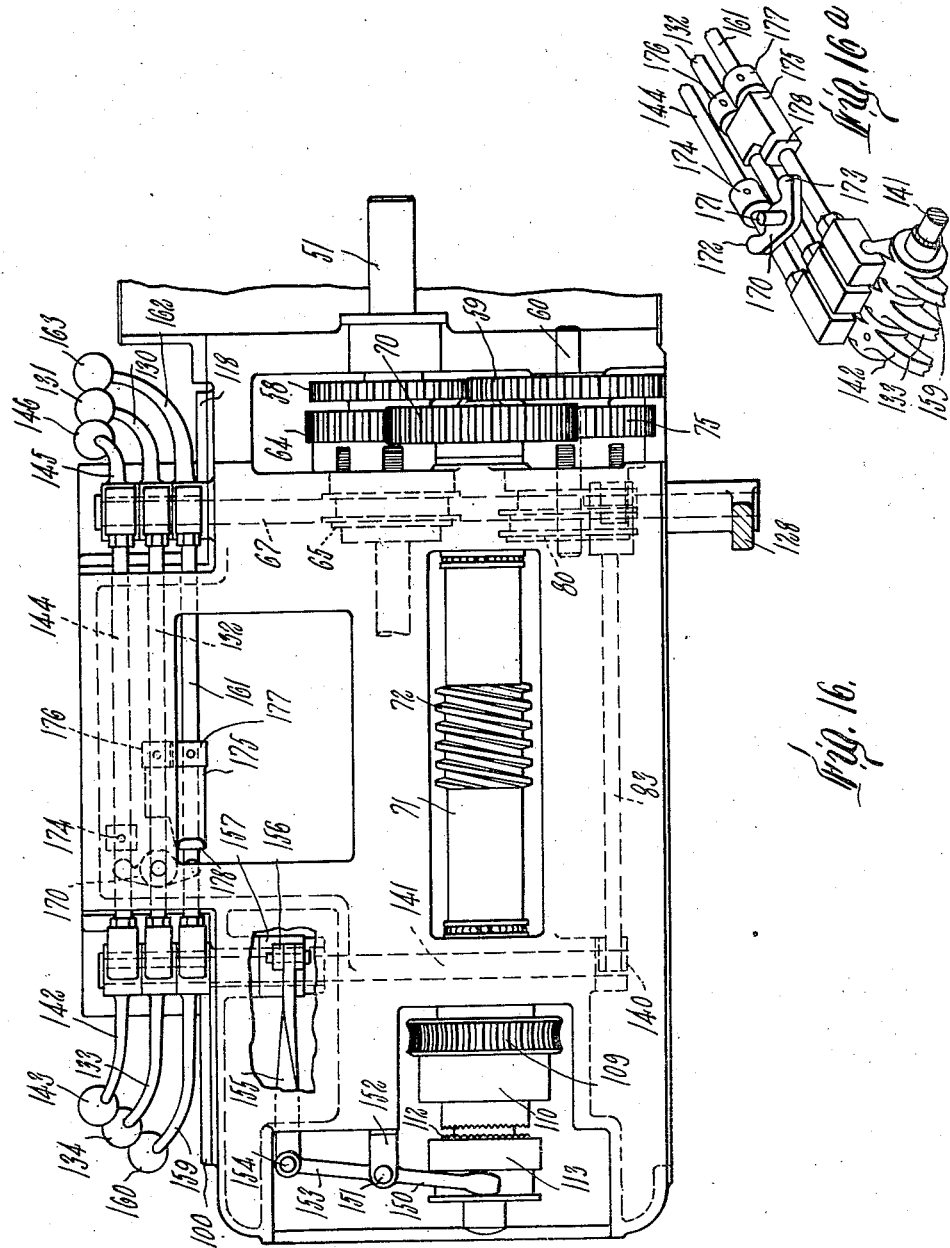

Figure 16 is a fragmentary top plan view of the right hand portion of the machine, the cover having been removed.

Figure 16a is a fragmentary perspective of the control interlock mechanism.

Figure 17:
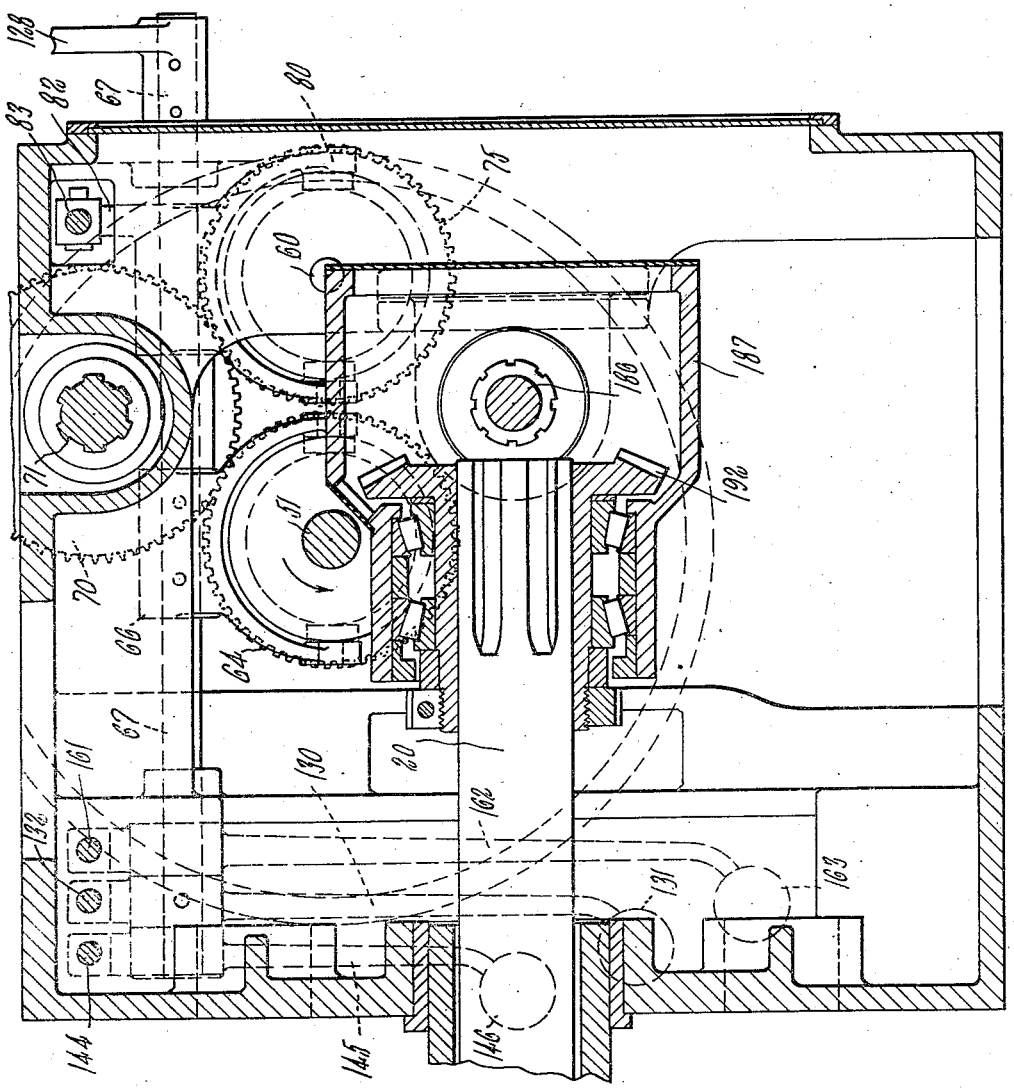

Figure 17 is a detail sectional view on line 17—17 of Figure 15.

Figure 18:
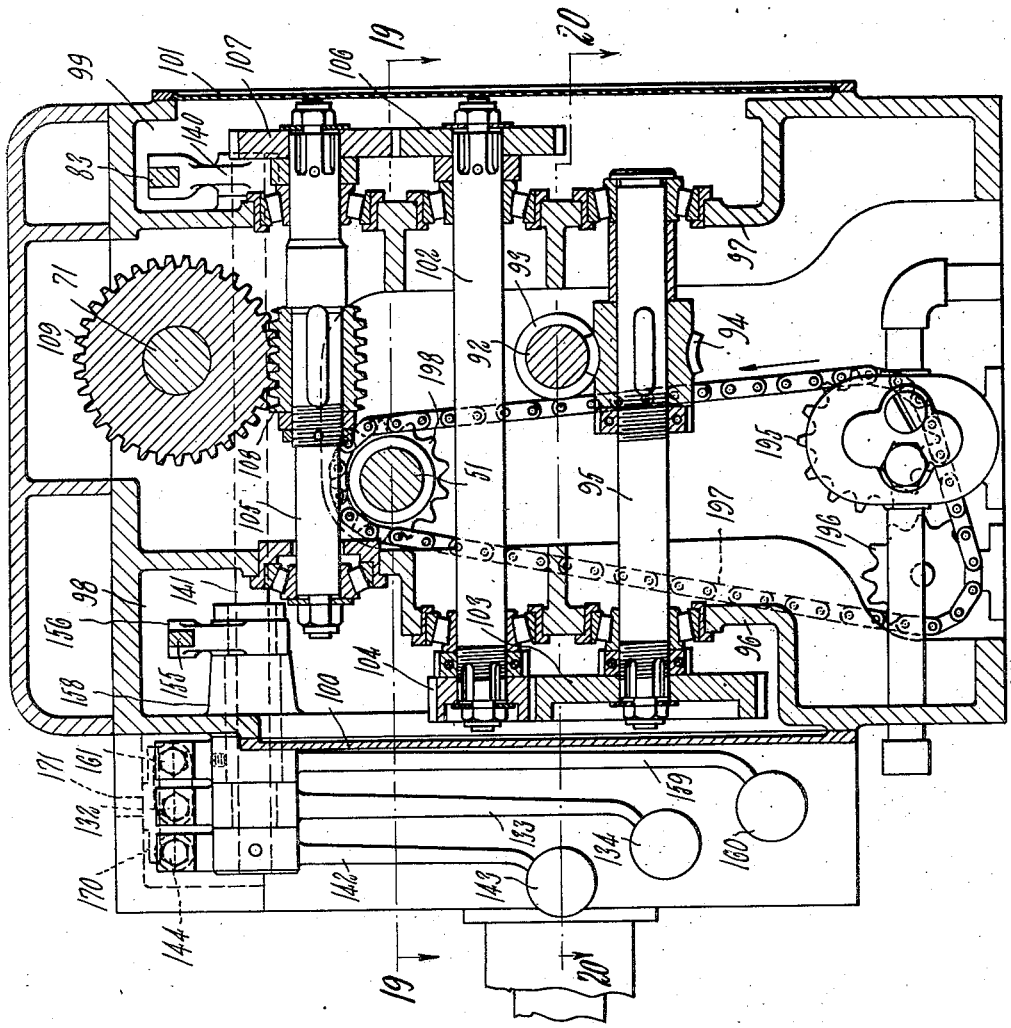
Figure 19:
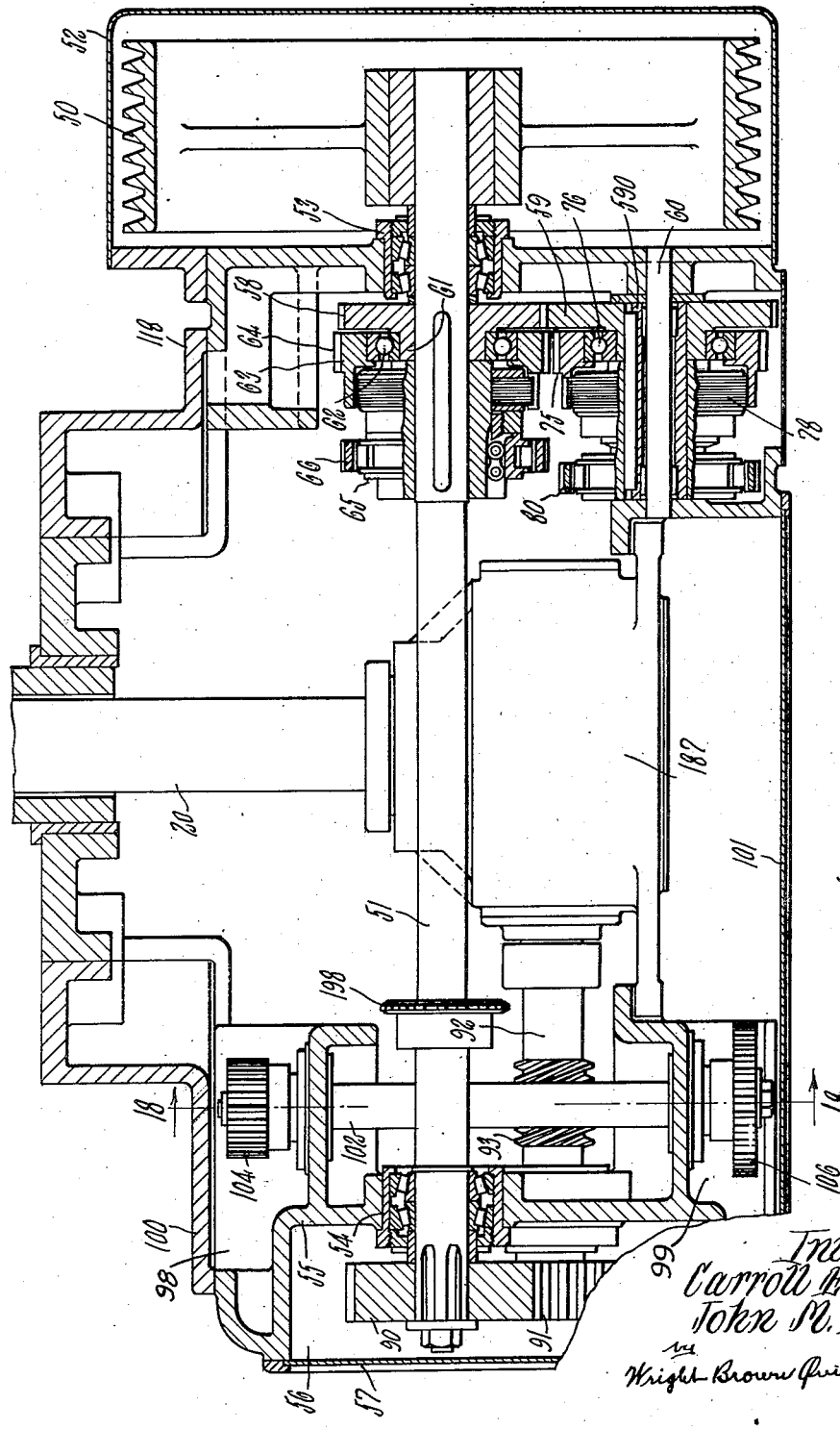

Figure 18 is a detail sectional view on line 18—18 of Figure 19.

Figure 20:
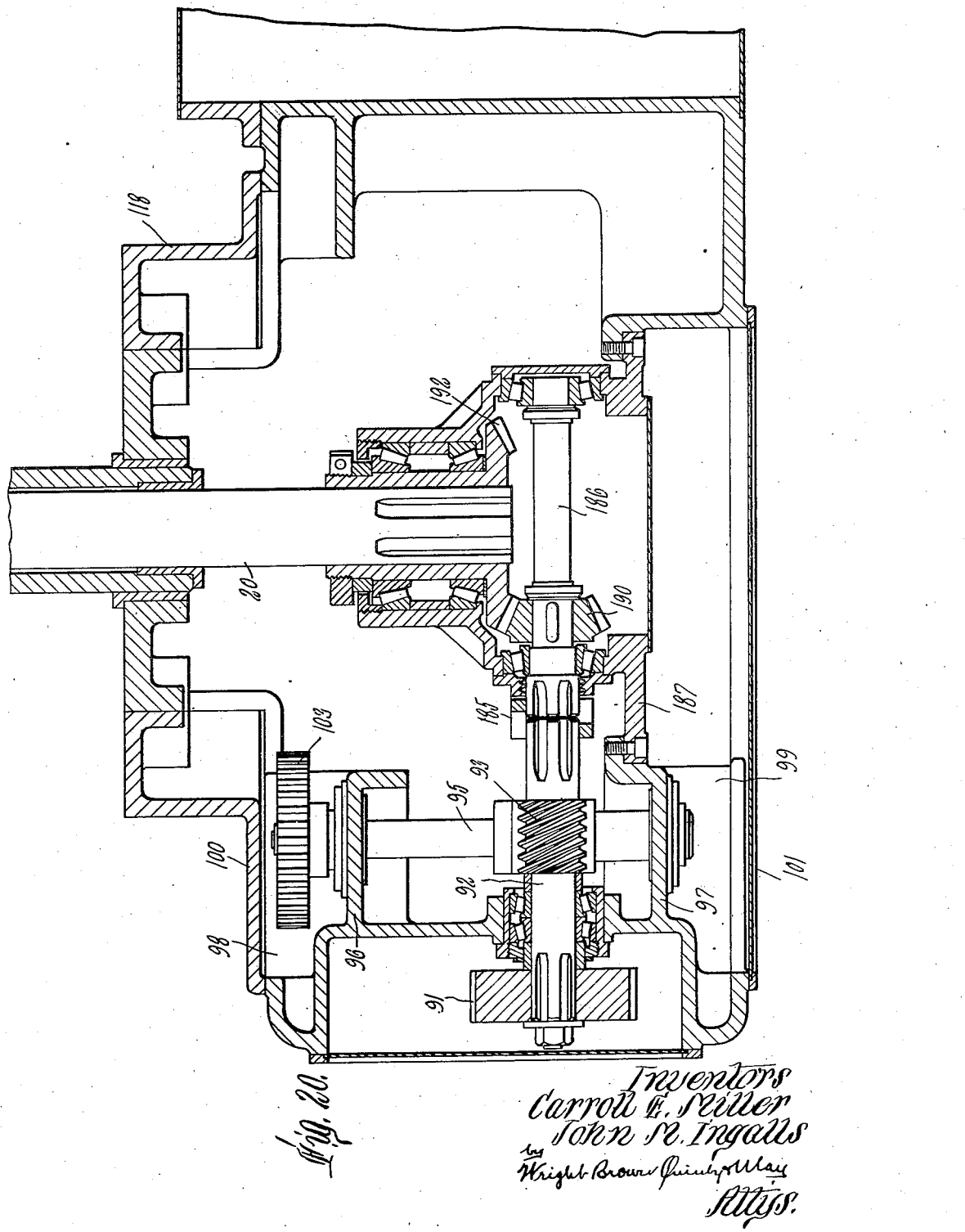

Figures 19 and 20 are detail sectional views on lines 19—19 and 20—20, respectively, of Figure 18.

Figure 21:
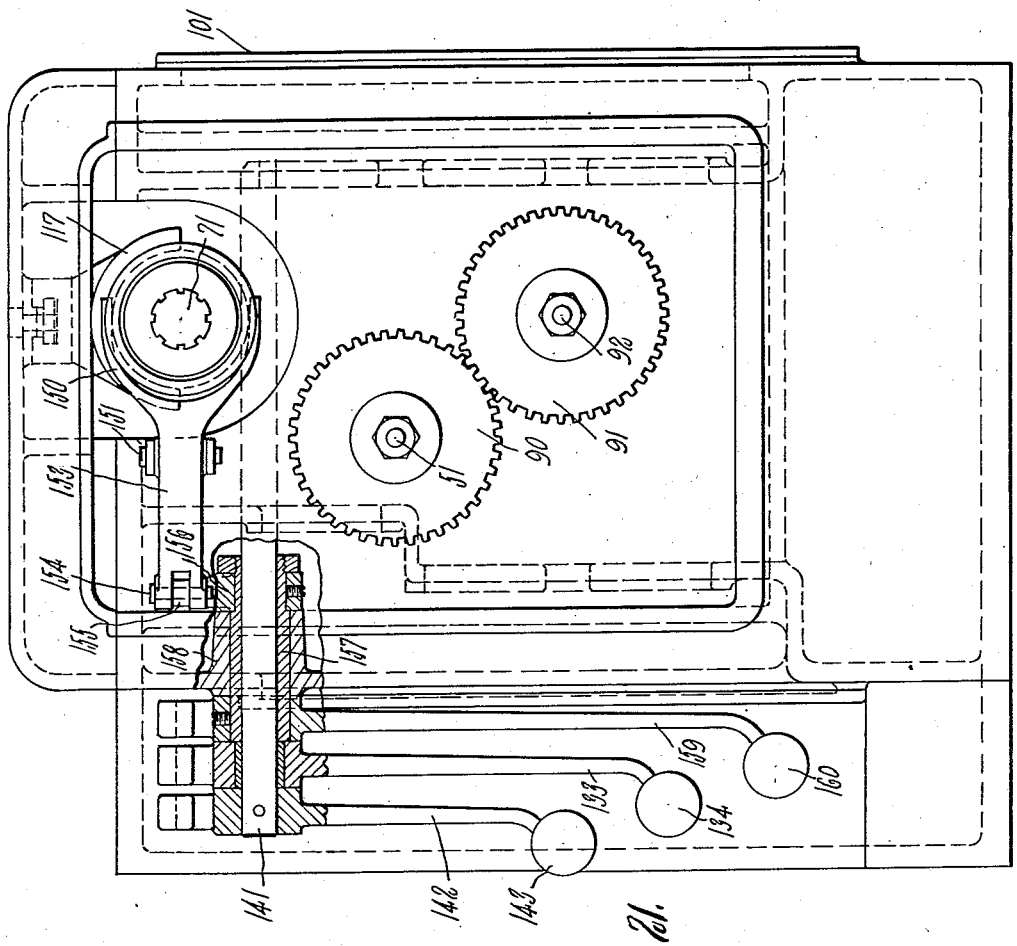

Figure 21 is a front elevation of the right hand end portion of the machine, the cover plate being removed.

Referring first to Figure 1 of the drawing, the invention is illustrated as applied to a machine of the well known cone type. It comprises a lower base 1 having at its right hand end an upwardly extended portion 2 surmounted by a column comprising the superposed frame parts 3 and 4. This column houses the driving mechanism for the machine as will later be more fully described.

Somewhat to the left of the center of the machine, the base 1 is provided with a pair of upstanding supports 5 and 6 which support a pair of spaced frame members 7 and 7', each provided with a central circular opening, the two openings being concentric. Within these openings is journaled a drum or turret 8 which supports for rotation therein, a plurality of work holding spindles 9 in circular array about the drum axis. As herein shown (see particularly Figures 4, 5, 9 and 14) eight of these spindles are employed, though for many aspects of the invention, this number is not material and might be any number desired.

Further to the left, the base 1 is provided with upwardly extending supports 10 and 11 above which are journaled in frame members rotary plates 12 and 13. Both of the plates 12 and 13 are provided with hubs at 14 and 15 secured to the central shaft 16 extending rearwardly from the drum or turret 8. The shaft 16 may extend to a suitable series of stock supports (not shown) in order that the stock supports may be indexed with the indexing of the drum or turret 8 so as to maintain stock extending into the work spindles in substantial alinement therewith. The plate 13 constitutes the first of these stock supports and is provided with stock supporting sleeves 17.

Each of the work spindles is rotated from a central shaft 20 arranged in axial alinement with the shaft 16. The rotary connections from the shaft 20 to the several spindles differ somewhat from previous practice, and for the purpose of providing a better distribution of wear and for relieving the center shaft of some of the torque stresses. To these ends, the shaft 20 has fixed thereto a wide faced gear 21 which meshes with gears 22 on each of the work spindles 9. As shown, each gear 22 is of substantially half the width of face of the gear 21 so that these gears can be larger than heretofore and arranged in overlapping relation to each other, as best shown in Figures 1 and 9, the gears 22 thus being in sets of four each, the gears of the sets alternating, one set of these gears engaging one end portion of the center gear 21, and the gears of the other set engaging the other end portion of the central gear 21. The gears 22 may thus be considerably larger than heretofore, which produces a more even ratio of drive from the center shaft 20 and relieves the center shaft of some of the torque stresses. The shaft 20 extends forwardly of the drum or turret 8 and into the right hand column through a hollow shaft 24 which is fixed to the drum 8.

Concentric with the shaft 20 and supported on the hollow shaft 24 by end bearing sleeves 25 and 26, is a cylindrical tool carrier 27, and this tool carrier 27, as shown best in Figure 14, may be provided with longitudinally extended T slots 28 for supporting suitable working tools in proper relation to the various work spindles in their working angular positions. The rear end of the carrier 27 is secured to the lower end of a slide 29, which is mounted for longitudinal sliding motion in an overhead frame portion, and is actuated to move the carrier 27 toward and from the drum 8 by a cam follower roll 30 carried by the slide 29 and actuated by suitable cams (not shown) on a cam drum 31 secured to an overhead cam shaft 32. This cam shaft is journaled in suitable bearings 33 and 34 of the right hand column of the frame member 4 and in journals 35 and 36 supported by the frame members 7 and 37. These bearings 33, 34, 35 and 36 form portions of an upper bed extending from the right hand column to the left end of the machine.

*Machine driving mechanism*

As before mentioned, the driving mechanism for the machine, including that for rotating the central shaft 20 and for rotating the cam shaft 32, which controls various other operations of the machine, is contained within the right hand column.

In the base of the machine and beneath the right hand column there is formed by the partition member 40 integral with the casting, a compartment 41 (see Figures 1 and 3) within which is mounted a driving motor 42. By forming this partition as an integral part of the base casting all leakage of oil into the motor compartment is avoided. As shown this driving motor is secured to a platform 43 suspended on a pivot shaft 44 at one end and supported from the bottom wall of the compartment at its opposite end on coil springs 45 which surround bolts 46, passed up from beneath, and having nuts 47 on their upper ends. The motor 42 is provided with a suitable drive pulley 48 over which pass the V belts 49 which extend over a drive pulley 50 secured to a shaft 51.

As shown best in Figures 3, 15 and 19, pulleys 48 and 50, and the belts 49 are housed within a hinged casing 52 on the back face of the right hand column so that these parts may be freely accessible when required. The shaft 51 is journaled in bearings 53 and 54 in the back and front walls, respectively, of the column, the front wall 55 being in-set to provide a chamber 56 normally closed off by a removable cover 57 for a purpose which will later appear. This shaft 51 has keyed thereto a gear 58 (see Figures 15, 16 and 19), this gear 58 meshing with a similar gear 59 keyed to a sleeve 590 (see Figure 19) journaled on a stub shaft 60. On a hub portion 61 of the gear 58 is journaled on the ball bearings 62, an outer ring member 63 of a disk clutch, provided with an external gear 64. This clutch element 63 may be connected to be driven by the shaft 51 by closing axial motion of the mating clutch member 65 adapted to be moved between clutching and unclutching positions by the motion of a yoke 66 secured to a rock shaft 67 (see Figures 15 and 17). The gear 64 meshes directly with a gear 70 on a shaft 71 which extends from front to back of the machine and has secured thereto a worm portion 72 meshing with a worm wheel 73 which is in normal driving relation to the cam shaft 32 by means which will later be described, so that when the clutch element 65 is in closed position, the cam shaft is driven at high speed from the shaft 51 through the clutch elements 65 and 63 and gear 64. If the clutch element 65 is in open position, the cam drum may be driven at fast speed in the reverse direction through the intermediate gear 59, this being done when a clutch gear element 75, also meshing with the gear 70 on the cam shaft drive shaft 71, and journaled concentric to the gear 59 on the ball bearings 76, is coupled for rotation from this gear 59 through the closing of the clutch 78. This clutch 78 is closed by closing motion of a clutch actuating yoke 80 which is journaled on the rock shaft 67 and has an arm 82 to which is secured an actuating rod 83 (Figures 16 and 17). The cam shaft is also arranged to be driven at a relatively slow working speed in the same direction as it is driven at high speed through the clutch gear 64. This low speed drive includes the shaft 51 to which is secured the belt pulley 50, and which is coupled to a shaft 92 through a pair of change gears 90, secured to the shaft 51, and 91 secured to a shaft 92 (Figures 15, 19 and 21). These change gears 90 and 91 are housed within the chamber 56 in the forward face of the column, and access thereto may be had by removing the cover plate 57. The shaft 92, just inwardly of the wall portion 55 in which it is journaled, has cut therein a worm gear 93 (Figures 15 and 19) which meshes with a similar gear 94 (Figures 15 and 18) secured to a shaft 95. This shaft 95 is arranged at right angles to the shafts 51 and 92, and beneath the shaft 92, and is journaled in bearings in opposite column wall members 96 and 97, as shown best in Figure 18. Each of these wall members 96 and 97 is set inwardly to form with adjacent wall portions an inner gear chamber 98 and an outer gear chamber 99 of an enclosure for the driving mechanism, which may be closed by removable cover plates 100 and 101, respectively. The cover 100, and a somewhat similar removable cover 118, (Figures 6 and 20), form outer halves of openings 119, the inner halves of these openings being through the column wall 455. These openings are for the purpose of receiving bearing bushings for end working tools (not shown) as commonly employed for operating on work at the front and back index stations. Such end working tools, for example, may be drilling or tapping attachments of the general type shown in the Miller Patent No. 2,236,440 granted March 25, 1941, for Automatic multiple spindle machine. By removing these covers the end working tools and bushings, all assembled, may be placed in position in driven relation to the driving mechanism within the column, after which the covers may be returned to hold these parts in place. This avoids the necessity in previous constructions of inserting the shafts for the end working tools and the bushings endwise through the forward wall of the column and thereafter connecting these shafts into the driving mechanism within the column.

Within the chamber 98, the shaft 95 is connected to a parallel shaft 102 through a pair of change gears 103 and 104. At the opposite end of the shaft 102 and within the outer end gear chamber 99, the shaft 102 is coupled with a parallel shaft 105 thereabove through a pair of change gears 106 and 107 fixed to the shafts 102 and 105, respectively. The shaft 105 has keyed thereto a worm 108 which meshes with a worm wheel 109 journaled on the cam shaft drive shaft 71. The worm gear 109 (Figure 15) drives through an overrunning clutch device 110, one element 111 of a clutch also journaled on the shaft 71. A mating clutch element 112 splined to the shaft 71 may be moved into clutching relation to the clutch element 111, thus to drive the shaft 71 from the worm gear 109, and this may be done by imparting axial motion to a clutch-controlling sleeve 113 which may wedge a series of balls 114 in between the clutch element 112 and a collar 115 located in a fixed axial position relative to the shaft 71 by a threaded clamp collar 116. The clutch element 111 is held in proper axial position by means of a yoke 117 (see Figures 15 and 21) extending across the outer face of the clutch element 111 and adjustably secured to the machine frame.

It will be noted from the foregoing description that the low or working speed of the cam shaft is produced through three sets of change gears, each accessible from a side portion of the right hand column by removal or opening of cover plates, one set of these change gears 90 and 91 being located in a recess or chamber in the front face of the column, another set of change gears 103 and 104 in a recess or chamber in the inner face of the column, and the third set 106 and 107 being located in a chamber or recess in the outer end face of the column. By this means the choice from a very large number of slow or working speeds of drive for the cam shaft is possible.

Means are provided for applying a brake to the gear 70 so as to slow down the shaft 71 when it is desired to disconnect the high speed drive and employ the low speed drive. As shown in Figure 15, this comprises a pair of levers 120, both pivoted on a shaft 121 and each having a shoe 122 adjacent to opposite faces of the gear 70. Normally the shoes are held out of contact with the faces of the gear 70, as by a spring 123 engaging pins 124 extending from the upper ends of the levers 120, but at suitable times these upper ends may be wedged apart by rocking of a shaft 125 having a flattened portion which engages therebetween, and so wedging the upper ends of these levers apart, and their lower ends carrying the shoes 122 into contact with opposite faces of the gear 70.

As shown best in Figure 3, this rock shaft 125 extends outside of the machine casing where it carries an arm 126 connected through a link 127 to a cam actuated lever 128. This lever 128 is fixed to the shaft 67 (Figure 17) on which the high speed clutch yoke 66 is pinned, the arrangement being such that when this clutch is closed, the brake is released from the gear 70 and when the clutch is thrown out, the brake is applied.

The cams for operating this lever 128 are carried by the end cam drum 129. These cams act to throw the high speed clutch in or out during different portions of the cycle, and when out, the drive is produced through the low speed drive mechanism previously described; the overrunning clutch permitting both the high speed and low speed drives to be engaged simultaneously. When the high speed drive is thrown out, the action of the brake shoes 122 slows down the speed of rotation of the cam shaft to that produced through the low speed drive. This friction is released as soon as the actuating cam has passed beyond the point of contact (Figure 3).

The shaft 67 extends across the machine and has pivoted near its outer end outside the machine and at the back of the machine, a hand actuating lever 130 having a hand knob 131 at its outer end. This lever 130 also has fixed thereto a rod 132 which extends across to the front of the machine and is attached to a lever 133 having a knob 134 thereon similar to the lever 130 and the knob 131, as shown in Figure 16, so that the operator is able to actuate the high speed clutch from either front or back of the machine.

The reverse clutch, as previously described, may be actuated through the motion of a rod 83 (see Figures 16 and 17). This rod 83 extends across the machine and is pivotally connected to an arm 140 (see Figures 16 and 18) secured to one end of a rock shaft 141. To the other end of this rock shaft 141 is secured the actuating lever 142 having an actuating handle 143 at its outer end.

To the upper end of the lever 142 is connected a rod 144, which extends across the machine to the back and is secured to the upper end of a lever 145 having an actuating handle 146 on its outer end. This lever 145 is journaled on the shaft 67. The low speed power feed clutch is controlled by the axial position of the clutch sleeve 113 determined by a shifting yoke 150 (see Figures 15, 16 and 21) which engages a peripheral groove in the outer face of the sleeve 113. This yoke 150 is fulcrumed at 151 to a bracket 152 secured to the machine frame and its arm 153 is pivoted at 154 to a link 155. The opposite end of this link 155 is pivoted to an arm 156 having a hub portion secured to a sleeve 157 journaled on the rock shaft 141. This sleeve 157 extends through the frame bearing 158, and to its outer end is secured an arm 159 having a handle 160 at its outer end. To the opposite end of the arm 159 is pivotally secured a rod 161 which extends across to the back of the machine where it engages the upper end of an actuating lever 162 journaled on the shaft 67 and having a handle 163. The rods 132, 144, and 161 are in parallel relation.

From the foregoing it will be seen that the power feed may be actuated from either the front or back of the machine by manipulation of the handles 160 or 163; that the high speed gear may be thrown in or out from either front or back of the machine by manipulating the handles 134 or 131, and that the reverse clutch may be actuated from either front or back of the machine by manipulation of the handles 143 or 146.

It is, however, essential that the reverse clutch and the forward clutches, either high or for power feed, shall not be brought into operation at the same time, and to prevent this, an interlock between them is provided, which is shown best in Figures 16 and 16a. Above the rods 144, 132, and 161 there is pivotally mounted a lever 170 fulcrumed on a fixed pin 171. This lever has rounded ends 172 and 173. The rounded end 172 is positioned to be contacted by a collar 174 fixed to the rod 144, while the end 173 may be contacted by a block 175 which is slidably mounted on both of the rods 132 and 161. The rod 132 has pinned thereto a collar 176, and the rod 161 has pinned thereto a collar 177, either of which may be brought against the rear end of the block 175 and move the block 175 so that its longer extremity 178 may strike the lever end 173. With this arrangement whenever either of the reverse levers, such as the lever 142 or 145, is moved to throw in the reverse clutch, the collar 174 engages the end 172 of the lever 170, and rocks this lever so that the opposite end 173 will contact with the block 175, and insure the positioning of this block engaging the collars 176 and 177 at the point where both the high and low forward working speed clutches are in open position. Likewise, when either of the high or low forward speed clutch levers are thrown into clutching relation, the corresponding collar 176 or 177, acting on the block 175, moves it forwardly to such a position as to insure that the collar 174 on the reverse clutch mechanism is moved to throw the reverse clutch out.

When all of these clutches are in open position, as is shown in the drawings, the cam actuating shaft 71 may be turned over by hand in either direction, for this purpose this shaft being extended to the left, as viewed in Figure 15, where it may be accessible to the operator, on removing the cover 57, for the attachment of a suitable handle (not shown) engaging the splined end of the shaft 71. The worm gear 73 which drives the cam shaft is arranged to do so through a suitable shearing pin or slipping connection in accordance with usual practice, so that on excessive overload of the cam shaft this driving connection is interrupted to avoid breakage of other parts of the machine.

Beside driving the cam shaft at its relatively slow working speed, the slow speed drive may also be employed to rotate the spindle drive shaft 20. As shown this drive is taken from the shaft 92, the inner end of which is coupled as by a coupling 185 to a short shaft 186 (see particularly Figures 15 and 17). This shaft 186 is journaled in a gear housing 187 which encloses the adjacent end of the shaft 20 and carries a beveled pinion 190 meshing with a beveled gear 192 secured to the end of the shaft 20.

From this mechanism may also be driven coolant and lubricating pumps 195 and 196, respectively, which are shown as driven through a sprocket chain 197 from a sprocket wheel 198 secured to the shaft 51.

*Work spindle indexing mechanism*

The indexing of the turret 8 to bring the spindles therein successively into the various operative positions is accomplished by rotation of a Geneva arm 200 secured to the cam shaft 32, as shown best in Figures 1, 2 and 12, but the Geneva wheel, instead of being carried by the drum or turret mechanism, is located above and forwardly thereof at 201, and instead of having the same number of Geneva slots 202 as there are stations, this Geneva wheel is shown as one-half the diameter of the indexing drum and having but half as many or four Geneva slots. This Geneva wheel is journaled on a stub shaft 203 (Figures 12 and 13) and has adjustably secured thereto a sprocket ring 204. This sprocket ring may be held in place on a reduced diameter portion 205 of the Geneva ring by a clamping ring 206 which is secured to the back face of the Geneva wheel, as by the screws 2070, but the ring 204 is free to be adjusted angularly for a limited distance with respect to the Geneva wheel. To this end the Geneva wheel has journaled in an opening therethrough a worm wheel 207 provided on its rear face with an eccentrically disposed pin 208 which rides in a radial slot 209 in a hub portion of the sprocket ring 204. By rotation of this worm wheel 207 the eccentric pin 208, engaging between the sides of the slot, will be moved, thus adjusting the angular relation between the sprocket ring 204 and the Geneva wheel. For the purpose of producing such adjustment and for locking the Geneva wheel and sprocket ring together in adjusted position, a pair of plugs 210 journaled in substantially radial arranged perforations 211 in the Geneva wheel have threaded portions which engage the teeth of the worm wheel. By rotation of these plugs 210, as by a screwdriver engaging their outer ends, it is evident that the worm wheel 207 may be angularly adjusted. The sprocket ring 204 is connected through a sprocket chain 215 with sprocket teeth on the ring member 12, secured to the shaft 16, which in turn, is secured to the back wall of the spindle-holding drum 8. The sprocket chain 215 passes beneath an idler sprocket wheel 216 journaled on a stub shaft 217 carried by a bracket 218 secured to the machine frame. By the use of the sprocket chain which wraps about a large arc of the circumference of the driving plate 12, the stresses of indexing are distributed over a large part of the circumference of the driving member rather than being localized, as is the case where the Geneva wheel is directly secured to the drum shaft, and by employing a smaller diameter driving sprocket wheel than that of the driven member, a correspondingly fewer number of Geneva slots are necessary. Any small variations in the drive, such as may be due to wear of the sprocket chain, may be taken up by adjusting the angular relation between the Geneva wheel and the sprocket ring 204 as previously described.

In order that the drum or turret may be indexed by hand, if desired, a hand operated lever 220 may be provided, this being fulcrumed on a stub shaft 221 on which it is axially slidable and carrying a post 222 at its upper end. The lever 220 is normally held in the inoperative position shown in Figure 12a by a spring 223 surrounding the stub shaft 221, but by pressing the lever 220 inwardly, the post 222 may be engaged in one of the Geneva wheel slots, whereupon by rocking the lever 220, the drum being unlocked, the Geneva wheel may be turned. When the lever is rocked into the dotted line position of Figure 12, then moved to bring the post 222 into the downwardly extending Geneva wheel slot, and then turned into the full line position of Figure 12, the drum will be indexed in forward direction. By first engaging the post 222 in the outwardly extending Geneva wheel slot in the full line angular position of Figure 12, and then swinging the lever 220 up to the dotted line position, the drum is indexed backwardly.

This indexing mechanism is not claimed herein but forms subject matter of a divisional application Serial No. 624,306 filed October 24, 1945 for Indexing mechanism.

*Turret locking mechanism*

After each indexing operation, the spindle carrying turret or drum is locked. Improved mechanism for accomplishing this is shown best in Figures 1, 2 and 9. The drum or turret 8 is provided with recesses 230 in longitudinally extending frame members 231 within which may be projected a locking bolt 232. This locking bolt is mounted for vertical sliding motion between a pair of gibs 233 and 234, which are carried within a slot 235 in a frame member 236. The bolt 232, as shown, is of rectangular cross section and engaging the top end thereof is a plate 237, pressed downwardly to project the bolt into locking position whenever permitted, by a pair of springs 238. Each of these springs surrounds a rod 239 threaded into the frame portion 236 at its lower end and having on its upper end adjusting and lock nuts 240 and 241 threaded thereon, the springs reacting between the plate 237 and washers beneath the nuts 240. One edge face of the locking bolt is provided with a slot 242 within which rides a pin 243 on one arm of a bell crank lever 244 fulcrumed at 245 on the frame member 236. The opposite arm of this bell crank lever carries a cam roller 246 which engages the periphery of a cam 247 carried by the cam drum shaft 32. When the high part 248 of this cam bears against the cam roller 246, the bell crank lever 244 is rocked upwardly, lifting the latch bolt out of one of the sockets 230 of the spindle-carrying turret or drum, thus releasing this drum for an indexing motion. When the high point 248 of this cam passes beyond the follower roll 246, the bolt is allowed to descend and enter one of the locking sockets 230 and hold the spindle drum or turret against rotation during which time the various machining operations are performed on the work carried by these spindles.

It is exceedingly important that the turret or drum be accurately locked in proper positions and the service to which the locking bolt is subjected is very severe. The spindle carrying drum or turret in the larger machines will weigh a ton or more, and hence the stopping and locating of this unit accurately presents a difficult problem. In accordance with the present invention the inner faces of the gibs 233 and 234 are coated with thin sheets 250 of beryllium copper. This beryllium copper is an alloy containing a small percentage of beryllium and a small percentage of cobalt, the remainder being copper. A representative formula is 2% beryllium, .25% cobalt and the remainder copper. The gibs 233 and 234 are preferably made of a fine grain annealed cast iron with the beryllium copper sheet attached to the inner faces of the gibs, as with silver solder. In the annealed state the surface of the beryllium copper can be scraped to bring a suitable bearing surface between the hardened steel locking bolt 232 and the gibs. This is a fast and relatively cheap operation. When this has been done, the gibs are heated to a relatively low temperature, say, between 550° F. to 600° F., which is less than the melting point of the silver solder, which may be in the neighborhood of 1175° F., and are held at that temperature for some hours, say, seven or eight, whereupon the beryllium copper becomes very hard. This hardening is accomplished without in any part distorting or injuring the surface, nor does it in any way change the gibs themselves. The bolt is preferably made of hardened tool steel.

With this arrangement two entirely different metal surfaces are in contact, all of the parts aer hardened, and the coefficient of friction between the hardened beryllium copper and the hardened steel bolt is relatively low, so that the bolt can be operated with the minimum amount of clearance between the parts and without requiring lubrication.

As shown, each of the gibs 233 and 234 is provided with a lateral projecting lug portion 251 and 252. The lug portion 251 projects within a slot 253 of a retaining plate 254 screwed onto the face of the frame member 236. The lug 252 projects into a similar slot 255 of a similar retaining plate 256. This plate 256 may be secured through screw and slot connections at 2370 to the frame member 236, and in order to adjust the gibs for wear, the gib 234 which has a sloping back face 258 may be moved up and down by similar motion imparted to the plate 256. As shown, this may be accomplished by manipulation of a lever 260 fulcrumed on a pin 261 secured to the frame member 236 and having a short arm 262 engaging within a slot 263 in the outer edge of the plate 256.

This turret locking mechanism is not claimed herein but forms subject matter of the divisional application Serial No. 624,306 to which reference has been made.

Tool slide arrangement

It will be noted that in each indexed position of the spindle carrier or turret, there are two spindles positioned in substantially horizontal alinement at the top, two at the bottom, and two on each side between the top and bottom spindles. This arrangement of the spindles in indexed position brings the top and bottom spindles out from the central vertical plane of the machine where they are more accessible and more easily inspected than when they are in this plane. It also permits a greater number of tools to be active on the work spindles at one time, and increases the number of positions at which tooling may be accomplished over the former arrangement, in which at each indexed position one spindle is at the top and another at the bottom. Thus, as shown in Figure 14, there may be upper and lower tool slides 300 and 301 at the front and back of the machine and moving from and toward the central vertical axis thereof. As shown each of the upper tool slides 300 carries a single tool holder 302 for working on the upper of the two side spindles, while the lower tool slide 301 has an upper tool carrier 303 working on the lower of the two side spindles and a lower tool carrier 304 operating on work at the lowest spindles. Each of these tool carriers is backed up by micrometer screws 318 held in adjusted position as by lock nuts 319. Upper and lower tool slides at both the front and back of the machine may be independently actuated, there being shown for this purpose sleeves 305 and 306 which are journaled on vertical shafts 307 and 308, respectively. The sleeves 305 and 306 are provided with integral arms 316, the back arm 316 being connected through a link 309 with a slide 310 having a cam follower roll 311 actuated by suitable cams on a cam drum 312 carried by the cam shaft 32. The forward arm 316 is similarly attached to a link 313, the opposite end of which is pivoted to a slide 314 having a cam roller 315 moved by cams (not shown) on a cam drum 317 also fixed to the cam shaft 32. The sleeves 305 and 306 are extended below the top of the machine frame and have arms 320 connected through links 321 to rods 322 carried by the top tool carriers 300. The shafts 307 and 308 carry arms 325. The back arm 325 is connected through a link 326 to a slide 327 having a cam roller 328 engaged by cams (not shown) on a cam drum 329 carried by the cam shaft 32. The front arm 325 is connected through a link 330 with a slide 331 having a cam roller 332 actuated by cams (not shown) on a cam drum 333, also carried by the cam shaft 32, as shown best in Figure 2. The lower portions of the shafts 307 and 308 have arms 334 connected by links 334a to the bottom tool slides.

The innermost positions of these front and back tool slides may be controlled by selective positive stops in accordance with usual practice, the positions of these stops being controlled by the heads of adjustable screws 335 projecting to different extents from the periphery of the spindle-carrying drum or turret and which successively engage an eccentric arm 336 carried by a rock shaft 337 (see Figures 1 and 9). The angular position of the rock shaft 337 controls the positions of the movable stop carriers such as is shown in the Cone Patent No. 1,716,303, with the exception that the controlling rock shaft shown herein is below rather than above the spindle-carrying drum and that there are eight instead of four positions in accordance with the number of index positions. By placing this rock shaft below rather than above the drum, it is more accessible and is more effectively lubricated by splash.

This arrangement of the work spindles when in indexed positions permits the use of a pair of tool holders 340 carrying tools operating on the work at the two top spindles, and as shown best in Figure 14, these tool carriers 340 may be secured to a vertically movable slide 341. At the front and back portions of this slide it is shown as connected by links 342 (see Figures 1 and 14) to a pair of rock arms 343 fulcrumed on an arched frame member 344. One of these arms 343, as shown in Figure 14 this being the rear arm, is connected through a link 345 to a slide 346, and as shown best in Figure 2, this slide 346 has a cam follower roll 347 adapted to be moved by cams (not shown) on a cam drum 348 carried by the cam shaft 32. Intermediate to their ends, the links 342 are joined together by a transverse bracing rod 349. A pair of adjustable stops 350 (see Figure 14) act to limit the downward motion of the tool slide 341. On each side of this slide 341 the machine frame upper bed members 355 are downwardly and inwardly inclined and have screw holes 356 therethrough to facilitate the securement of various tooling attachments carrying other tools for operating on work at either of the top or next adjacent work spindles as may be desired.

Stock handling mechanisms

As shown herein, this machine is an eight-spindle machine arranged to work in two sets of four spindles each, although if desired, by disconnecting certain of the parts, the cycle may be arranged to take place in all eight rather than in four positions. In Figures 1 and 5 mechanism for clamping and releasing the work through the usual spring collets is illustrated. The collets for the various spindles are opened and closed by axial motion, as in usual practice, for which purpose the spindles are provided with spools 370 between the flanges of which ride yokes 371. Each of these yokes has secured to its outer end a flanged shoe 372 adapted to ride in a pair of arcuate tracks 373 and 374 slidably guided on bars 372a and at the top and bottom between these tracks on the track sections 375. These track sections 375 are supported at opposite ends of a yoke member 376 pivoted at top and bottom on pivot pins 377. At the top of the yoke 376 it carries a cam follower roll 378 adapted to be controlled by cams on a cam drum 379 also carried by the cam shaft 32, so that at each index position, a pair of collets are in position to be moved axially by rocking of the yoke 376, thus to release and clamp the stock at these stations at suitable times. During other portions of the rotation, while the shoes 372 are in engagement with the tracks 373 and 374, the collets are held in clamping axial position. When the machine is operated as a single eight-spindle machine the upper shoe 375 is removed. Beneath the track 374 there is an intermediate position where the next to the bottom spindle has its collet mechanism under control of a lever 380 which is fulcrumed at 381 and has a socket at its outer end for the reception of an actuating bar 380a, this lever carrying a track section 382 with which the shoe 372 of that particular spindle engages. The spindle at this station, therefore, can have its collet opened by hand by swinging the lever 380 whenever this is desired. This is done in order to load stock in the spindle, there being a single loading station whether the machine is operated as a double four or as a single eight-spindle machine. The inner end of this lever 380, however, extends over into the path of motion of the lower end of the yoke member 376 so that the opening swing of the yoke member 376 will insure closing the collet at this station before the spindle carrier is next indexed in case the operator should have neglected to close this collet after loading stock in the spindle.

In Figures 1, 4, 7 and 8, mechanism for feeding the stock to the spindles when the collets are released is illustrated. This feeding mechanism, comprising the usual stock pusher for each spindle, includes the annular heads 400 at the outer end of each spindle which are arranged to be reciprocated at suitable times to retract, while the stock is being clamped by the spring collets, to take a fresh grip on the stock, and then to be advanced while the collet is open to project the stock through two of the spindles at upper and lower stations when the machine is arranged to operate as a double four-spindle machine, and at one of these positions only (the lower) when it is arranged as a single eight-spindle machine. Each of these annular heads 400 has its axial position controlled by a yoke member 401 slidably mounted on a supporting rod 4011 secured at its ends in the plates 12 and 13, and having an arcuate groove to receive this head, each of these yokes 401 having at its outer end a shoe 402 slotted to engage opposed fixed track members 403 which hold the pusher mechanism stationary during each index position, except at the loading and unloading positions at the top and bottom of the spindle drum. Between the ends of these tracks 403, the shoes 402 engage track sections 404 carried at the ends of arms 405 of a yoke 406 fulcrumed at top and bottom on the pivots 407. The upper member 404 is removed when the machine is operated as a single eight-spindle machine. As shown best in Figure 7, the top arm 405 is provided with an extension 410 which may be secured in adjusted position by a screw 411 in an arcuate slot in an extension 4120 from an arm 412 which is fulcrumed on the top pivot 407 and carries a cam roller 413 engaging an edge drum cam 414 carried by the cam shaft 32. This cam follower 413 is pressed into contact with this edge cam by a spring 415 surrounding a rod 416 pivoted at 417 to the lower arm 405 and slidable through a pivot member 418 journaled in a top flange 419 of the bed 1. This spring 415, also, tends to hold the arms 405 to position their track sections 404 in the same plane as the tracks 403 so that during the indexing of the turret these track sections will be in position to receive the yoke or yokes 402 of that or those spindles which come into the loading and unloading position. The further back the arms 405 are swung corresponding to a greater extent of feed, the greater the returning force exerted by the spring 415.

The extent of feed motion may be adjusted by adjustment of position of the screw 411, since this determines the inward limit of motion of the arm 412 following the contour of the actuating cam and thus the length of the cam face effective thereon. This should be adjusted so as to be sufficient to move the stock at each actuation of the feed into contact with the stock stops, which are illustrated best in Figures 1, 6 and 14. These stops are indicated at 450, two of these being shown and carried by arms 451 fixed to a pair of rock shafts 452. The upper rock shaft 452 extends through a hole in the slide 29. These rock shafts are shown as splined so that the positions of the arms 451 may be adjusted therealong as determined by the axial position of a supporting bar 453 for the lower shaft 452, and an axial movable support 454 for the upper shaft 452. The rear ends of these shafts are journaled in the inner wall 455 of the column 3. The axial position of the lower stop to determine the length of the stock fed through the spindles is determined by the axial adjustment of the bar 453, which is shown as a rack bar engaged by the threads of a worm 456 secured to an operator actuable shaft 457. The axial position of the upper stock stop, which is used only when the machine is set up as a double four-spindle machine, is determined by turning a shaft 458 threaded through the axially movable support 454 and provided with a check nut 459 to lock the shaft 458 against turning. These rock shafts 452 are turned at suitable times to cause their respective stops 450 to be presented into axial alinement with the spindles at the work feeding stations while the stock is being fed thereto, after which they are rocked out of the way so that tooling operations may be performed on the work. This rocking motion is produced from a cam groove 460 in a cam 461 carried by the cam drum 31. Riding within this cam groove is a cam follower roll 462 (see Figure 6) carried by an arm 463 fulcrumed at 464. The opposite end of this arm 463 is pivoted at 465 to a link 466, which is, in turn, pivoted to a lever 467 fulcrumed at 468. This lever 467 has a slot 469 therein within which engages a crank pin 470 on an arm 471 secured to the top rock shaft 452. The outer end of the lever 467 is pivotally connected to the upper end of a link 472, the lower end of which is pivoted as at 473 to a lever 474. This lever 474 is fulcrumed at 475 and has a slot 476 at its inner end, within which rides a pin 477 carried by a rock arm 478 secured to the bottom rock shaft 452. The upper crank pin 470 is removed when the machine is operated as a single eight-spindle machine since then the stock is fed at the lower station only.

From the foregoing description of an embodiment of this invention, it should be evident to those skilled in the art that various changes and modifications might be made without departing from the spirit or scope of this invention.

We claim:

1. In a machine of the class described, work supporting means, tool supporting means, means for relatively moving said supporting means to cause tools on said tool supporting means to perform an operative cycle with respect to work held by said work supporting means, means for driving said moving means selectively at a relatively fast speed in either of two directions and at a relatively slow speed in one direction, a controller for each of said fast speeds and a controller for said slow speed, each of said controllers including a rod movable axially when the corresponding controller is actuated, said rods being arranged in parallel relation, and interlocking connections between said rods causing actuation of a controller to condition said moving means to move in one direction to insure the inoperative condition of a controller to condition said moving means to move in the reverse direction.

2. In a machine of the class described, work-supporting means, tool-supporting means, means for relatively moving said supporting means to cause tools on said tool-supporting means to perform an operative cycle with respect to work held by said work-supporting means, means including a clutch for driving said moving means in one direction at fast speed, means including a clutch for driving said moving means in the reverse direction, means including a clutch for driving said moving means in said one direction at slow speed, an actuating means for said clutches including an axially movable rod for each clutch, and interlocking connections between said rods insuring that when one of said clutches is closed the one or two clutches for driving said moving means in the reverse direction shall be open.

3. In a machine of the class described, work-supporting means, tool-supporting means, means for relatively moving said supporting means to cause tools on said tool-supporting means to perform an operative cycle with respect to work held by said work-supporting means, means including a clutch for driving said moving means in one direction at fast speed, means including a clutch for driving said moving means in the reverse direction, means including a clutch for driving said moving means in said one direction at slow speed, an actuating means for said clutches including an axially movable rod for each clutch, said rods being arranged in parallel relation, a collar fixed to each rod, a block slidably mounted on the clutch rods for said first and third mentioned clutches, and a lever having its ends positioned, one to be engaged by said block and the other to be engaged by the collar on said reverse direction clutch in relation so that when said reverse direction clutch is closed the other of said clutches are open and when either of the other of said clutches is closed said reverse direction clutch is open.

4. In a machine of the class described, an indexing turret, a plurality of rotary work spindles for bar stock arranged in circular series about the indexing axis of said turret, each of said spindles having an axially movable stock feeding device, a rotary stock support spaced from said turret, means connecting said support for indexing motion with said turret, guide bars connecting said stock support and turret adjacent to each of said spindles, yoke members slidable on said guide bars and each engaging one of said devices, and means for moving said yoke members along their respective guide bars at suitable times to feed stock through said work spindles.

CARROLL E. MILLER.
JOHN M. INGALLS.

(References on following page)

REFERENCES CITED

The following references are of record in the file of this patent:

UNITED STATES PATENTS

| Number | Name | Date |
|---|---|---|
| 673,015 | Castle | Apr. 30, 1901 |
| 1,125,779 | Waite | Jan. 19, 1915 |
| 1,271,540 | Cone | July 9, 1918 |
| 1,322,352 | Schellenbach | Nov. 18, 1919 |
| 1,495,234 | Reilly et al. | May 27, 1924 |
| 1,671,354 | De Leeuw | May 29, 1928 |
| 1,703,986 | Brown | Mar. 5, 1929 |
| 1,934,620 | Cone | Nov. 7, 1933 |
| 2,114,177 | Cone | Apr. 12, 1938 |
| 2,130,809 | Miller | Sept. 20, 1938 |
| 2,187,681 | Drissner | Jan. 16, 1940 |
| 2,236,440 | Miller | Mar. 25, 1941 |
| 2,310,568 | Atlee et al. | Feb. 9, 1943 |